United States Patent [19]

Bishop

[11] Patent Number: 4,849,462
[45] Date of Patent: Jul. 18, 1989

[54] ULTRAVIOLET-CURABLE COATINGS FOR OPTICAL GLASS FIBERS HAVING IMPROVED ADHESION

[75] Inventor: Timothy E. Bishop, Algonquin, Ill.

[73] Assignee: DeSoto, Inc., Des Plaines, Ill.

[21] Appl. No.: 140,725

[22] Filed: Jan. 4, 1988

Related U.S. Application Data

[63] Continuation-in-part of Ser. No. 550,442, Nov. 10, 1983, abandoned.

[51] Int. Cl.$^4$ .......................... C08F 2/50; C08F 20/36; C08F 130/08; G02B 6/00
[52] U.S. Cl. .................................. 522/97; 350/96.34; 522/96; 522/172; 526/286; 526/301; 525/455
[58] Field of Search .................. 522/96, 97; 350/96.34

[56] References Cited

U.S. PATENT DOCUMENTS

| | | | |
|---|---|---|---|
| 3,920,313 | 11/1975 | Wong | 428/441 |
| 4,099,837 | 7/1978 | Vazirani | 427/54.1 |
| 4,167,305 | 9/1979 | Ichiba | 427/163 |
| 4,311,726 | 1/1982 | Hacker | 427/54.1 |
| 4,472,019 | 9/1984 | Bishop | 522/96 |
| 4,660,927 | 4/1987 | Kondow | 428/429 |

*Primary Examiner*—Allan M. Lieberman
*Assistant Examiner*—Arthur H. Koeckert
*Attorney, Agent, or Firm*—Dressler, Goldsmith, Shore, Sutker & Milnamow, Ltd.

[57] ABSTRACT

Optical glass fiber having its glass surface adherently coated with an ultraviolet-cured coating of a liquid ultraviolet-curable coating composition is disclosed in which the composition comprises an ultraviolet-curable polymeric polyacrylate, a photoinitiator to render the composition curable with ultraviolet light, and from about 0.5% to about 5% of the coating composition of a polyalkoxy silane containing an organic substituent carrying a single mercaptyl hydrogen atom capable of reacting with acrylate unsaturation by Michael adduction. These compositions provide improved adhesion to the glass surface of the optical fiber which is well retained after exposure to high humidity atmospheres.

6 Claims, No Drawings

4,849,462

ULTRAVIOLET-CURABLE COATINGS FOR OPTICAL GLASS FIBERS HAVING IMPROVED ADHESION

This application is a Continuation-in-Part of my prior application Ser. No. 550, 442 filed Nov. 10, 1983, now abandoned.

TECHNICAL FIELD

This invention relates to radation-curable coatings for optical glass fibers to improve adhesion to the glass, particularly after exposure to high humidity atmospheres. Ultraviolet radiation is particularly contemplated.

BACKGROUND ART

The coating of optical glass fibers with low tensile modulus resin coatings to protect these fibers against abrasion is known, as is the desirability of using coating compositions which cure rapidly on exposure to ultraviolet radiation for this purpose. In many instances it is desired to have the coating adhere strongly to the glass fiber surface, and to maintain this adhesion despite exposure to high humidity atmospheres. However, the ultraviolet-curing coatings which provide appropriate coatings for the optical glass fiber are not strongly adherent to the glass surface. Moreover, the limited adhesion which does exist is markedly impaired when moisture penetrates the coating.

It is desired to provide ultraviolet-curing coatings which cure to possess improved adhesion to the optical glass fiber surface, and which maintain the desired adhesion despite exposure to moisture.

DISCLOSURE OF INVENTION

In accordance with this invention, a liquid radiation-curable polyethylenically unsaturated coating composition has incorporated therein from 0.5% to 5% of a polyalkoxy silane containing an organic substituent which carries a single active hydrogen atom with is capable of reacting with ethylenic unsaturation by Michael adduction, said single active hydrogen atom being the mercaptyl hydrogen atom. Such compounds can vary, but it is preferred to employ the compound gamma-mercaptopropyl trimethoxy silane because it is commercially available. For purposes of comparison, amino silanes with more than one active hydrogen atom are also available and provide the best adhesion among the amino silanes. These are illustrated by gamma-aminopropyl triethoxy silane and N-beta--(N-vinylbenzylaminopropyl) trimethoxy silane. However, these amino silanes introduce stability difficulties and they do not retain their adhesion well on humidity exposure which is the crucial consideration for optical fiber coatings.

Since coating the glass surface of optical fibers is particularly intended, the coating composition should cure on radiation exposure to have a room temperature tensile modulus which is low enough (less than about 150,000 psi.) to minimize the danger of microbending at reduced temperature. Acrylate unsaturation and ultraviolet cure are preferred.

The polyalkoxy silanes are preferably methoxy-substituted, most preferably trimethoxy substituted, with a single aliphatic substituent carrying a single mercaptyl hydrogen atom. These apparently react with the ethylenic unsaturation, preferably acrylic in nature, either during or before radiation exposure. Regardless of when the reaction occurs, the limited coupling of the silane compound with the available ethylenic unsaturation provides superior adhesion and adhesion retention on humidity exposure.

Polyalkoxy silanes having other reactive groups have been tried, such as gamma methacryloxypropyl trimethoxy silane, but these do not perform nearly as well as those employed herein.

When very low service temperatures are contemplated, optical glass fiber is presently protected by applying to the freshly formed glass fiber a buffer coating of a resin which preferably possesses an appropriate refractive index, e.g., in excess of 1.48, and a low tensile modulus (below 10,000 psi. preferably below 2,000 psi.) which remains low at very low temperature ($-60°$ C.) to minimize the danger of microbending when such low temperatures are encountered. These low tensile modulus buffer coatings are overcoated with a topcoat to provide enhanced moisture resistance and abrasion resistance. When higher service tmperatures are contemplated, economy suggests a single coating, and these are selected to have a somewhat higher tensile modulus so that the coating on the glass will better resist abrasion and moisture. Regardless of which type of coating is applied to the glass, one still needs to minimize the tensile modulus while enhancing adhesion to the glass and while maintaining this adhesion despite exposure to humid atmopsheres.

For rapid application and cure, coatings which cure on exposure to radiation, preferably ultraviolet radiation, are needed. As a result, the resistance to moisture and the capacity to maintain adhesion on exposure to moisture must be built into an ultraviolet curable coating composition which adheres to glass and which has ancillary properties appropriate to the coating of optical glass fibers.

Radiation-curable coatings for optical glass fiber may be of various types, but it is always necessary to provide the low to moderate tensile modulus needed in a coating which will contact the glass, to employ a polyethylenic polymeric organic compound. Many appropriate polyethylenic organic compounds are known, and those which are not liquid can be combined with unsaturated liquids to assist application, but it has been difficult to achieve preferred properties. Coatings of relatively low tensile modulus which are usually overcoated by coatings developed by Robert E. Ansel, are disclosed in U.S. Pat. No. 4,624,994 issued Nov. 25, 1986. These can be described as ethylenic-terminated polyurethane, polyamide or polyurea oligomers having a molecular weight in the range of about 2000 to about 8000 and containing one amide, urea or urethane group for every 300 to 900 units of molecular weight, and containing polyalkylene polyether, polyalkylene polythiol or polyalkylene polyester in which the alkylene moiety contains 2 to 6 carbon atoms. These are preferably diacrylate polyurethane-ureas, and they are combined with 20% to 50% of the composition of a radiation-curable monoethylenic monomer havig a $T_g$ below about $-10°$ C., such as phenoxyethyl acrylate, and with 2% to 20% of a monoethylenic monomer having a strong capacity for hydrogen bonding, such as N-vinyl pyrrolidone.

An illustrative coating of the above type is a mixture of acrylate-capped polyurethane oligomer with N-vinyl pyrrolidone and phenoxyethyl acrylate. This mixture, with 3% of diethoxy acetophenone as photoinitiator, can be ultraviolet-cured on freshly drawn optical glass fiber, and it can be modified to enhance retention of adhesion to the glass on humidity exposure in accordance with this invention. This composition is used as the control and in the tabulated modifications of the control which are evaluated hereinafter in Example 3.

As a matter of interest, the illustrative coating which was tested was a commercial composition sold by DeSoto, Inc., assignee of this application, under the trade designation Desolite 950-030 which contains 58.28% urethane acrylate oligomer, 6.83% N-vinyl pyrrolidone, 31.96% phenoxyethyl acrylate, 2.92% diethoxyacetophenone and 0.01% phenothiazine. The urethane acrylate oligomer referred to above is a diacrylate-functional polymer constituted by 30.02% organic diisocyanate (Desmodur W from Mobay), 56.50% polypropylene glycol having a molecular weight of about 1000, 6.62% 2-hydroxyethyl acrylate, 6.71% polyoxypropylene diamine having a molecular weight of about 230, 0.10% dibutyl tin dilaurate and 0.05% 3,5-tert dibutyl, 4-hydroxy toluene.

Another type of very low tensile modulus coating which is usually overcoated is described in Ansel et al. European publication No. 0113779 published July 25, 1984 (see also PCT International Publication No. W084/00424. These coatings can be described as consisting essentially of an organic polysiloxane having from 2 to 6 reactive side chains each of which carry a functional group providing one reactive site which has been reacted to provide a single radiation-curable monoethylenically unsaturated side chain. There is about one such side chain for every 500 to 5000 units of molecular weight. This preferably provides a prime coating which has a tensile modulus at room temperature (25° C.) and also at −60° C. which is below 3000 psi.

These coatings can be illustrated by reacting one mole of 2-hydroxyethyl acrylate with one mole of isophrone diisocyanate to produce an acrylate-functional urethane monoisocyanate and then reacting three moles of this reaction product with one mole of tris(2-hydroxy polyoxypropyl) polysiloxane of average molecular weight of 600 and equivalent weight of 2000 (80% methyl substituted and 20% polyoxypropyl substituted). Upon the addition of 3% of diethoxy acetophenone photoinitiator, the mixture can be ultraviolet-cured on freshly drawn optical glass fiber, and it can be modified to enhance adhesion on exposure to humid atmospheres in accordance with this invention.

Moderate modulus coatings which are useful without topcoating can be provided by combining: (1) from 65% to 85% of a diethylenic-terminated polyurethane, which may contain urea groups, this polyurethane being based on a diisocyanate having an average molecular weight of from 400 to 40000; and (2) from 5% to 25% of a radiation-curable monoethylenically unsaturated liquid monomer having a $T_g$ below about −20° C. These are illustrated by an adduct of two moles of 2-hydroxyethyl acrylate with one mole of a diisocyanate-terminated polyurethane made by adducting toluene diisocyanate with a polytetramethylene glycol formed by polymerizing tetrahydrofuran to a molecular weight of 600–800. The polyurethane formed by acrylating this diisocyanate has a molecular weight of about 1900. 75.4 parts of this product mixed with 2.5 parts of benzophenone, 0.4 parts of benzil dimethyl ketal photoinitiator, 9 parts of trimethylol propane triacrylate and 12.4 parts of ethoxy ethoxyethyl acrylate provides a coating composition which can be coated upon optical glass fiber and ultraviolet cured to provide an effective single-coated product which is used as the control in the Table presented hereinafter. This coating composition can also be modified in accordance with this invention to increase its capacity to retain adhesion to the glass upon high humidity exposure.

All proportions herein are by weight, unless otherwise specified, and $T_g$ denotes the glass transition temperatures which, for a monomer, is the glass transition temperature of a homopolymer made from that monomer Since ultraviolet cure is preferred, acrylic unsaturation is best, but since the radiation can vary, electron beam radiation is useful, though less preferred, so the character of the ethylenic unsaturation can vary. Other useful unsaturations are illustrated by methacrylic, itaconic, crotonic, allylic, vinylic, etc. These can be provided (using methacrylic unsaturation as illustrative) by reaction of isocyanate functionality with 2-hydroxyethyl methacrylate. Allylic unsaturation may be introduced using allyl alcohol in place of 2-hydroxyethyl acrylate. Vinylic unsaturation may be introduced using hydroxy butyl vinyl ether.

Accordingly, while acrylate unsaturation has been referred to previously as illustrative and preferred, other radiation curable monoethylenically unsaturated compounds may be used, though more powerful radiation would be necessary, as illustrated by electron beam radiation.

The radiation which effects cure will vary with the photoinitiator used. Even visible light may be employed using appropriate photoinitiators. These are illustrated by camphor quinone and coumarin which are used together with a tertiary amine, such as triethyl amine. Diphenylbenzoylphosphine oxide is useful in and near the ultraviolet range.

When ultraviolet light is employed, the coating composition will usually contain a ketonic photoinitiator, such as about 3% of diethoxy acetophenone. Other photoinitiators are also known, such as acetophenone, benzophenone, m-chloro-acetophenone, propiophenone, thioxanthone, benzoin, benzil, anthraquinone, and the like. The photoinitiators may be used singly or in mixtures, and are present in an amount up to about 10% of the coating, usually 1–5%. Various amines may also be added, like diethyl amine, but are not needed in many instances.

The invention is illustrated by a series of coating compositions formulated by simple mixing of the components tabulated below. The mixture is warmed to about 55° C. for 1 hour to dissolve all of the components.

TABLE

| Component | Control | Ex. 1 | Ex. 2 |
|---|---|---|---|
| 1-Urethane acrylate oligomer | 75.7 | — | — |
| 2-Trimethylolpropane triacrylate | 9.0 | — | — |
| 3-Ethoxy ethoxyethyl acrylate | 12.4 | — | — |
| 4-Benzyl dimethyl ketal | 0.4 | — | — |
| 5-Benzophenone | 2.5 | — | — |
| 6-Items 1-5 combined | — | 99.0 | 99.0 |
| 7-Gamma-aminopropyl triethoxy silane | — | 1.0 | — |
| 8-N—Beta-(N—vinylbenzylaminoethyl)-gamma-aminopropyl trimethoxy silane.hydrogen chloride (40% in methanol) | — | — | 1.0 |
| Adhesion (g/in)[see note 1] | 24/11 | 123/71 | 131/49 |

Note 1: This is a 180° peel test on a 3 mil film on glass. The film is pulled back upon itself to measure the force which removes the film from the glass. The first number is the initial adhesion. The second number is the adhesion after 24 hours exposure of the coated glass to 95% relative humidity at 25° C.

As can be seen, polyalkoxy silanes improve adhesion and retention of adhesion on humidity exposure, but further improvement is provided herein.

EXAMPLE 3

To illustrate this inventon, an ultraviolet curable optical fiber coating composition which cured to provide excellent initial adhesion of 442 gm/in was greatly damaged by 24 hours exposure to 95% relative humidity at 25° C. such that the adhesion after exposure was only 9 gm/in. This composition was modified to include 0.6% of diphenyl amine and 0.3% of dilauryl thiodipropionate and 1% of gamma aminopropyl triethoxysilane. The diphenyl amine and the dilauryl thiodipropionate enhance the stability of the composition which is poor when the aminosilane is used, but these agents are not needed when the mercaptosilane is used. The initial adhesion was improved to 561 gm/in. But after humidity exposure, adhesion decreased to 86.8 gm/in. Omitting the diphenyl amine and dilauryl thiodipropionate since they are unnecessary, and replacing the aminosilane with 1% of gamma-mercaptopropyl trimethoxy silane, provided an initial adhesion of 604 gm/in. This initial adhesion only decreased to 245 gm/in after the specified humidity exposure.

Accordingly, the mercaptosilane was the only agent capable of markedly increasing the adhesion after humidity exposure, being almost three times more effective than the aminosilane tested. Moreover, and as shown in the Table, the aminosilane selected for comparison with the mercaptosilane was the best among the aminosilanes tested for adhesion after humidity exposure.

EXAMPLE 4

Further tests have now been made using current production of the Desolite 950-030 described previously using the same adhesion tests described previously. In this instance the ultraviolet lamps provided light concentrated in the wavelength range of 350-400 nanometers, and the exposure of the 3 mil thick coatings on polished new glass plate applied an ultraviolet dosage of 3.5 Joule per square centimeter.

The unmodified Desolite 950-030 containing no adhesion promoter resisted peeling from the glass surface with a resistance of 522 grams per inch of width under ambient conditions, but after the previously described 24 hour humidity exposure, adhesion had fallen off to 14 grams per inch of width.

The Desolite 950-030 was modified by stirring in one of several agents using simple agitation at room temperature in each instance. First, and using a 1% addition of methacryloxypropyl trimethoxy silane, the ambient adhesion was 516 grams per inch of width, but humidity exposure reduced this to 58 grams. With a 1% addition of the most effective commercially available amino silane known to me, namely: gamma aminopropyltriethoxy silane, the ambient adhesion was 566 grams per inch of width, but humidity exposure reduced this to 73 grams. It is here noted that this aminosilane-containing composition lacks long term stability in the absence of added stabilizer, but it was here applied shortly after preparation to avoid any in stability difficulty.

Lastly, a 1% addition of mercaptopropyl trimethoxy silane was made. This time the ambient adhesion was 659 grams per inch of width, and humidity exposure only reduced this to 185 grams. The addition of the mercaptosilane introduces no long term stability difficulty.

As will be evident, the mercapto silane was more effective to enhance adhesion than any of the other agents tested. Of greatest signficance is the fact that it was more than twice as effective in enhancing adhesion after humidity exposure than the commercial aminosilane even when ancillary agents promoting stability are omitted with the composition being tested before instability could introduce any problem.

What is claimed is:

1. An optical glass fiber having its glass surface adherently coated with an ultraviolet-cured coating of a liquid ultraviolet-curable coating composition adapted to deposit, after said ultraviolet cure, an adherent cured coating on a glass surface, said composition comprising an ultraviolet-curable polyurethane polyacrylate, a photoinitiator to render said composition curable with ultraviolet light, and from about 0.5% to about 5% of the coating composition of a polyalkoxy silane containing an organic substituent carrying a single mercaptyl hydrogen atom capable of reacting with acrylate unsaturation by Michael adduction.

2. A coated optical glass fiber as recited in claim 1 in which said polyalkoxy silane is gamma-mercaptopropyl trimethoxy silane.

3. A coated optical glass fiber as recited in claim 2 in which said polyacrylate is a polyurethane urea.

4. A coated optical glass fiber as recited in claim 1 in which said composition cures to provide a film having a tensile modulus less than about 150,000 psi.

5. A coated optical glass fiber as recited in claim 1 in which said composition cures to provide a film having a tensile modulus less than about 10,000 psi.

6. A coated optical glass fiber as recited in claim 2 in which said composition cures to provide a film having a tensile modulus less than about 10,000 psi.

* * * * *